Oct. 10, 1939.   C. SEAMAN   2,175,322

METHOD OF PRODUCING SHIRRED MATERIALS

Original Filed Jan. 4, 1938   4 Sheets-Sheet 1

INVENTOR.
CHARLES SEAMAN
BY WM. S. Pritchard
ATTORNEY.

Oct. 10, 1939. C. SEAMAN 2,175,322
METHOD OF PRODUCING SHIRRED MATERIALS
Original Filed Jan. 4, 1938 4 Sheets-Sheet 2
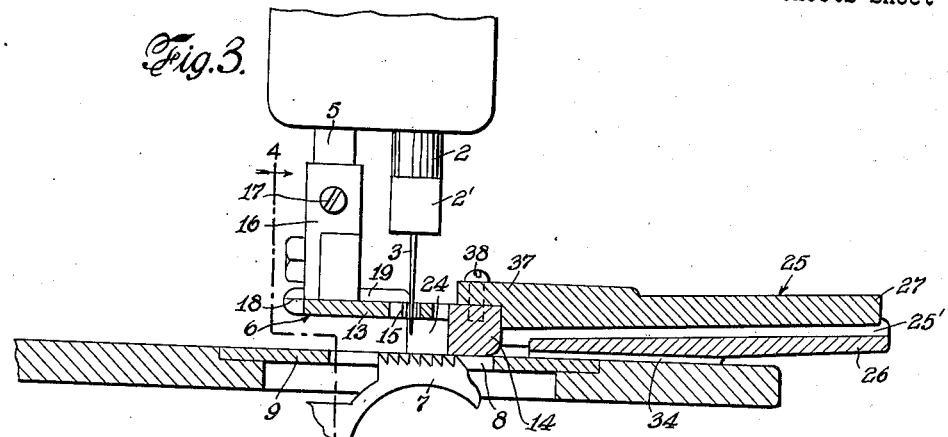
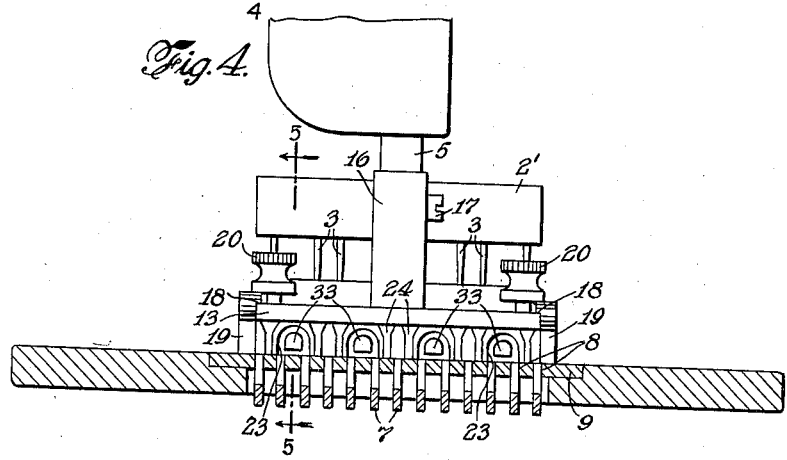
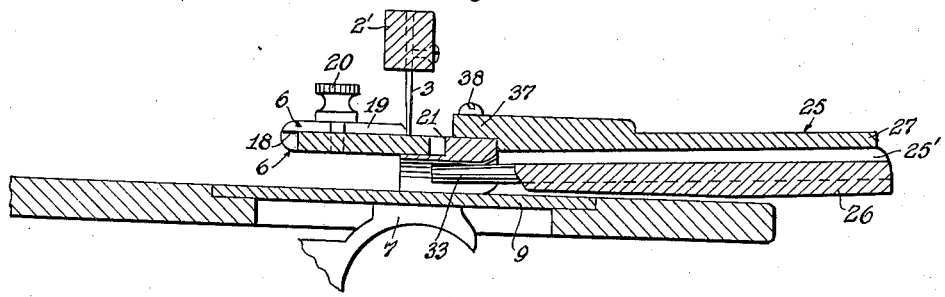
INVENTOR.
CHARLES SEAMAN
ATTORNEY.

Oct. 10, 1939.  C. SEAMAN  2,175,322
METHOD OF PRODUCING SHIRRED MATERIALS
Original Filed Jan. 4, 1938  4 Sheets-Sheet 3
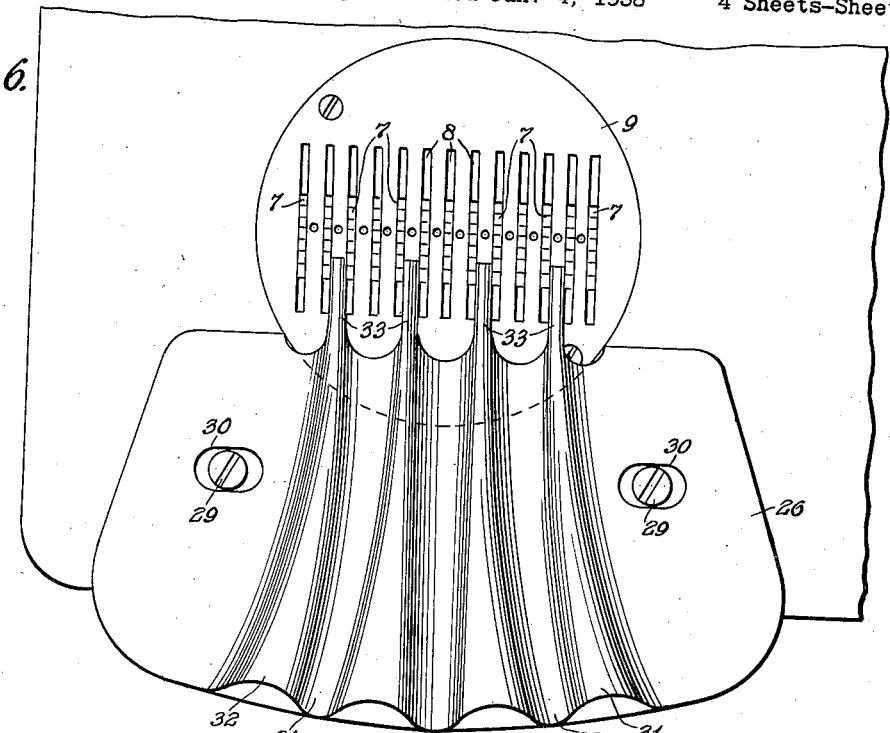
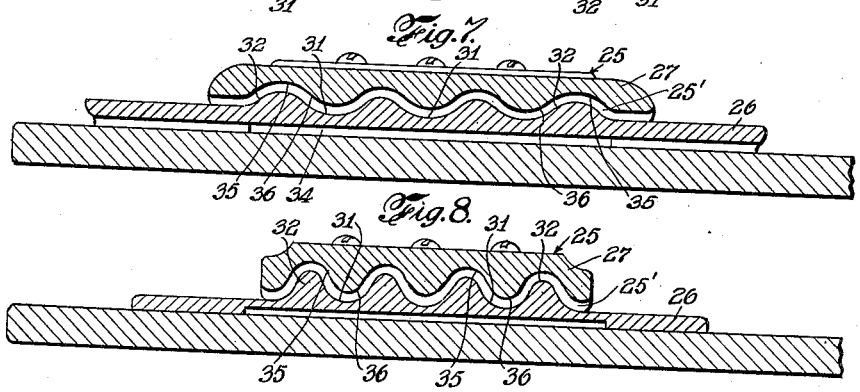
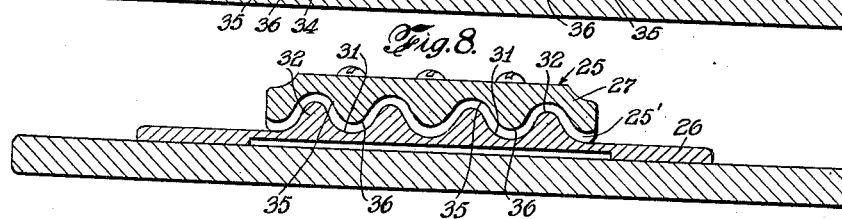
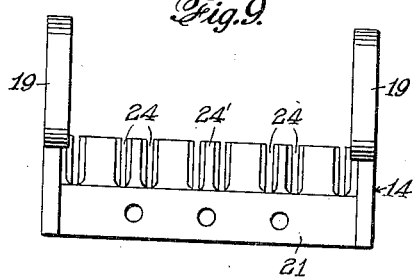
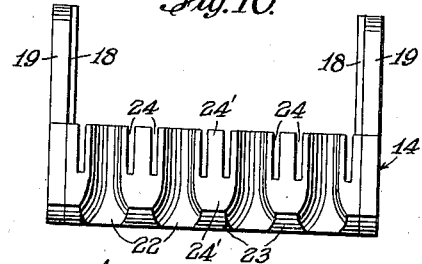
INVENTOR.
CHARLES SEAMAN
BY
ATTORNEY.

Oct. 10, 1939.    C. SEAMAN    2,175,322
METHOD OF PRODUCING SHIRRED MATERIALS
Original Filed Jan. 4, 1938    4 Sheets-Sheet 4

INVENTOR.
CHARLES SEAMAN
BY Wm. S. Pritchard
ATTORNEY.

Patented Oct. 10, 1939

2,175,322

UNITED STATES PATENT OFFICE 2,175,322

METHOD OF PRODUCING SHIRRED MATERIALS

Charles Seaman, Jamaica Estates, N. Y.

Original application January 4, 1938, Serial No. 183,281. Divided and this application January 14, 1939, Serial No. 250,909

6 Claims. (Cl. 112—262)

This invention is a division of copending application Serial No. 183,281 (now Patent No. 2,147,462) and relates to a highly ornamental shirred material, and particularly to the method of making the same.

In accordance with the principles of this invention, a shirring material is formed, as by passage through a suitable passage, with alternate ridges and furrows. The shirring material in this condition is fed beneath an appropriately designed presser foot toe, whereby the ridges and furrows of the material are substantially maintained during the feeding of the material to the needles of a multiple-needle sewing machine and during the stitching thereof.

The presser foot and the feed dogs are so designed and arranged that the material is fed at a greater speed to the needles than away from the needles. As a consequence, the material, prior to the stitching operation, is shirred.

The presser foot is also so designed that the needles of the machine stitch the material while it is still in cooperative engagement with the presser foot toe. More particularly, the presser foot is mounted in the machine so that the material will be stitched at approximately each bottom bend between the ridges and furrows of the material.

In order to retain the puffed shirred and flat shirred areas in position, the shirred material is stitched to a suitable base material. In one form of the invention, the base material is fed beneath the shirring material under the presser foot toe, whereby the said base material is flat shirred. The stitches penetrating the shirred material and the base material permanently retain the puffed shirred and flat shirred areas in the product even when the product is subjected to stress, either in a longitudinal or transverse direction.

In order to more fully explain the method constituting the instant invention, reference will be made to the accompanying drawings, showing an illustrative apparatus for carrying out the method and several illustrative products produced by the method, wherein:

Figure 3 is a section taken on the line 3—3 of Figure 1;

Figure 4 is a section taken on the line 4—4 of Figure 3;

Figure 5 is a section taken on the line 5—5 of Figure 4;

Figure 6 is a top plan view with various parts removed and showing the details of construction and the location of one of the members of the attachment with respect to the base plate, feed dogs and needle apertures;

Figure 7 is a section taken on the line 7—7 of Figure 1;

Figure 8 is a section taken on the line 8—8 of Figure 1;

Figure 9 is a top plan view of the presser foot toe;

Figure 10 is a plan view of the bottom of the presser foot toe;

Figure 1:
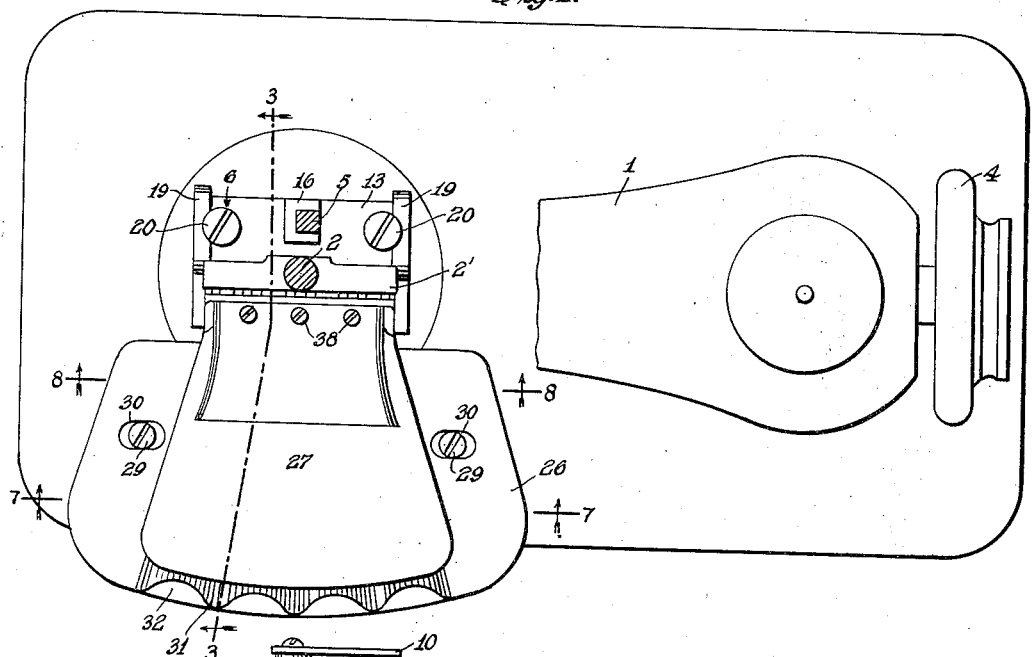
Figure 1 is a top plan view of the attachment as applied to the base of a multiple-needle sewing machine head, with parts broken away to more clearly illustrate the details of construction.
Figure 2:
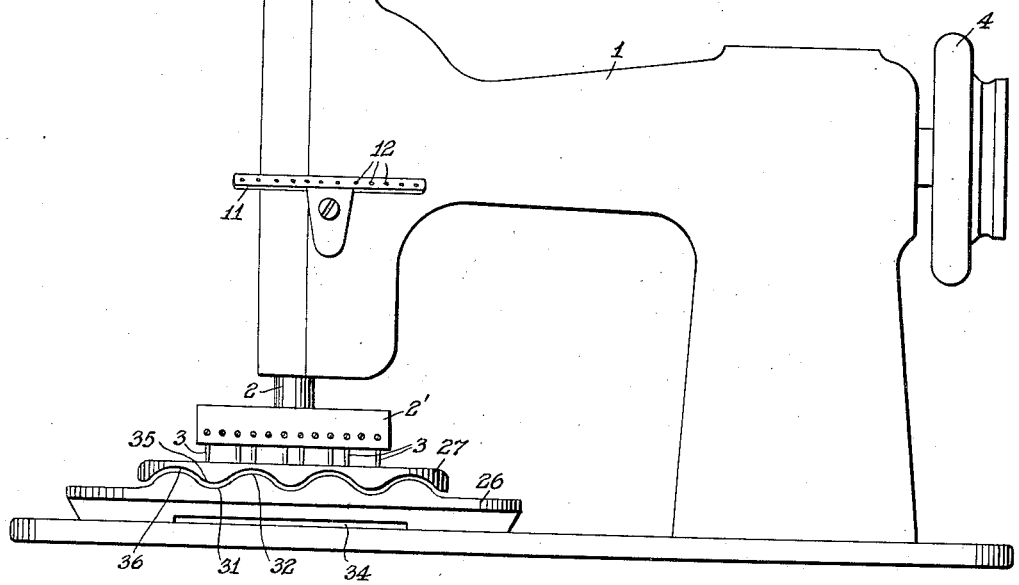
Figure 2 is a side elevation of a multiple-needle sewing machine having applied thereto the attachment constituting one phase of the invention.

Referring now to the drawings wherein an illustrative apparatus for securing the objects of the invention is shown and wherein like reference numerals designate like parts, the reference numeral I designates a multiple-needle sewing machine head supporting a needle bar 2 provided with a needle carrier 2' in which a plurality of needles 3 are mounted. The needle bar 2 is actuated (vertically reciprocated) in any suitable manner by a pulley 4 which, in turn, is driven in any well-known manner. The head I is also provided with a presser foot bar 5 carrying a presser foot generally indicated by the reference numeral 6 and hereinafter more fully described. The head I is also provided with the usual means for vertically adjusting the presser foot bar and also with a manually actuated handle or lever (not shown) of the usual type for raising and lowering the presser foot.

The machine also includes a work-feeding mechanism which comprises a plurality of spaced feed dogs 7 positoned with respect to the presser foot 6 as hereafter explained and extending through slots 8 in the base plate 9 of the machine. The feed dogs 7 are operated and actuated in the usual well-known manner.

Means are also provided to guide the threads (not shown) from their source of supply to the respective needles. In the form shown, this is accomplished by a thread guide 10 pivotally mounted on the needle bar 2 and the thread guide 11 secured to the machine head intermediate the guide 10 and the needles 3. Each of the guides 10 and 11 is provided with a plurality of apertures 12, the number of which corresponds to the number of needles 3 that the machine is designed for, so that a thread for each needle can be fed thereto.

The presser foot generally indicated by the reference numeral 6 comprises a body member 13 and a toe 14. The body member 13 comprises a plate formed with slots 15 through which the needles 3 pass in the course of the stitching operation. The body member 13 is also provided with a grooved block 16 which is slidably and adjustably mounted on the presser foot bar 5. By means of a set screw 17, the presser foot 6 is secured to the presser foot bar 5. By this construction, the presser foot 6 is capable of adjustment. The longitudinal edges of the body member 13 of the presser foot 6 are positioned beneath and cooperate with overhanging flanges 18 of the spaced arms 19 of the toe 14. By means of set screws 20, the body member 13 is secured to the arms 19, as shown in Figures 4 and 5 of the drawings. By this construction, the body member 13 can be moved and adjusted to the desired position on the arms 19, thereby properly positioning the slots 15 thereof with respect to the needles 3. This construction also permits adjustment of the body member 13 with respect to the toe 14.

The details of construction of the presser foot toe 14 are generally indicated in Figures 4, 9 and 10. Between the forward ends of the spaced arms 19 there is secured a block 21, which on the under surface thereof is formed with alternate curved grooves 22 and ridges 23 for reasons which will become apparent. Each of the ridges 23 at its forward end is solid and beveled or curved so as to permit easy movement of the material therein or thereunder. The rear portion of each of the ridges 23 is provided with a plurality of slots 24 through each of which a needle 3 passes in the stitching operation. It is to be noted that the members adjacent the slots 24 are beveled. This is for the purpose of permitting a certain amount of play in the needles during the stitching operation. The lower surfaces of the ridges 23 are substantially flat and serve to press the material fed thereunder into position for feeding by the feed dogs 7. It is further to be noted that each feed dog 7 is positioned intermediate the slots 24 and cooperates with the front portion of the ridges 23 and the parts 24' intermediate the slots 24 as well as the body member 13.

The toe 14 is positioned and adjusted in the machine so that the needles 3 will pass through the slots 24 and thus stitch the goods prior to leaving the toe 14. This is shown in Figure 3. As shown in Figure 3, the toe 14 of the presser foot is in closer proximity to the feed dogs than the body member 13. Consequently the goods under the toe 14 is fed to stitching position at a greater speed than the goods is withdrawn under the body member 13, with the result that the goods is shirred prior to stitching. The same results may be secured by having the dogs 7 cooperate only with the toe 14.

It is clear that the alternate ridges and furrows formed in the shirring material are substantially retained by the toe 14 during the feeding thereof as well as during the shirring and the stitching operations.

In order to present the material in proper condition to the presser foot and thence to the path of the needles, there is provided a mechanism generally indicated by the reference numeral 25 which is designed and constructed to form corrugations (furrows and ridges) in the shirring material fed therethrough. As clearly shown in Figures 3 and 4, the mechanism 25 comprises a lower member 26 and an upper member 27 forming a passage 25' therebetween which imparts the furrows and ridges to the shirring material fed therethrough.

The lower member 26 is adjustably mounted on the base of the machine in any suitable manner. In the form shown, the plate 26 is secured to the base by means of screws 29 cooperating with slots 30 formed in said plate.

The top surface of the plate 26 is provided with alternate grooves 31 and ribs 32. The ribs 32, as shown in Figure 6, terminate in spaced pins 33 which extend in the grooves 22 of the toe 14 (see Figure 4) and aid in guiding the shirring material from the passage 25' to the presser foot toe 14. As shown in Figures 2, 6, 7 and 8, the ribs 32 flare outwardly from the pins 33 to the forward end thereof. The plate 26 is also provided with a groove 34 in the bottom thereof which, together with the base of the machine, constitutes a passage through which the base material to which the shirring is to be stitched is fed to the needles. It is to be noted that the base material is fed in a flat condition beneath the shirring material to the presser foot toe 14. During the feeding thereof under the toe 14 the base material is also shirred.

The top plate 27 is on its under surface also provided with alternate grooves 35 and ribs 36. The ribs 36 of the plate 27 are disposed in the grooves 31 of the plate 26, and the grooves 35 of the plate 27 receive the ribs 32. By this arrangement the plates 26 and 27 produce the corrugated passage 25' (see Figures 2, 7 and 8) whereby material fed therethrough is given a corresponding shape. It is to be noted that the grooves 35 and ribs 36 of the top member 27 terminate adjacent the edge 27' of the plate 27.

In the form shown, the exist side of the passage 25' is positioned in close proximity to the presser foot toe 14. Specifically, the presser foot toe 14 is disposed with respect to the exit of passage 25' so that a pin 33 of the plate 26 extends centrally in a corresponding groove 22 of the toe 14. Each pin 33 is of a length so that it terminates just prior to the end of the groove 22. The pins 33 serve to maintain the ridges in the shirring material as it is being fed to the needles (including the shirring operation) and during the stitching operation.

In the embodiment shown, the toe 14 of the presser foot 6 is secured to the plate 27. Thus, the passage 25' is directly controlled by the presser foot. Upward and downward movement of the presser foot 6, or even the toe 14 thereof, will cause corresponding upward and downward movement of the plate 27. With the foregoing in view, the upper surface of the plate 27 is provided with a forwardly projecting flange 37 which extends over onto the block 21 of the toe 14, and the two are secured thereto by means of screws 38 passing through aligned holes in said flange and block.

Though the toe 14 substantially retains the ridges and furrows (imparted to the shirring material by passage thereof through the passage 25') during the feeding thereof to the needles and during the stitching operation, separate means may be used to perform each of these functions.

In operation, after the presser foot 6 has been adjusted as necessary, the shirring material is fed into and through the passage 25' formed by the plates 26 and 27 whereby it is provided with alternate ridges and furrows. At the same time a base material to which the shirred material is to be stitched is fed through the groove 34 and beneath the presser foot toe 14. The shirring material in its corrugated state and guided by the pins 33 is fed to the toe 14 and on top of the base material. By virtue of the pins 33 and the details of construction of the toe 14, the ridges of the corrugations in the material are fed into the grooves 22 of the toe, and the furrows of the corrugated shirring material are fed underneath the flat ridges 23 of the toe. The feed dogs 7 feed the materials in position for stitching by the needles 3. Due to the relationship of the body member 13 and the toe 14 with respect to the feed dogs 7, as previously explained, the materials are shirred and in this condition fed to the needles for stitching. As shown in Figure 3, the needles 3 stitch the materials while they are still in cooperative relationship with the toe. In other words, the stitching is effected while the shirring material is maintained in substantially the corrugated form imparted to it by the passage 25' and the shirring given to it. Each needle passes through the slots 24 and stitches the materials at points immediately therebeneath. In other words, each needle stitches the materials at approximately a bottom bend between a ridge and a furrow of the shirring material. The ridges of the corrugated shirring material constitute a puffed shirring, and the furrows produce a flat shirring in the final product. The stitches are at substantially the bend or fold between the puffed and flat shirrings.

Due to the shirring operation, an excess of shirring material is provided in the ridge portion of the shirring material which is disposed in the grooves 22 of the toe 14. After the material is stitched as aforementioned and leaves the machine, the excess material in the ridges assumes a more or less ornamental appearance, the ornamental appearance depending upon the adjustment of the various parts of the apparatus as well as upon the size of the stitch.

The base material to which the shirring material is stitched serves to retain the puffed shirring and the flat shirring in place.

In the form shown, the apparatus produces a product having four puffed shirrings and three flat shirrings arranged alternately and extending throughout the length thereof. Eight rows of stitches are employed, with the result that an eight-needle machine is used. Any number of alternate puffed and flat shirrings may be made by utilizing an appropriate mechanism 25, presser foot toe 14 and number of needles. Likewise, by appropriate widths of the elements aforementioned and spacing between the needles, different widths of puffed and flat shirrings may be secured.

The final appearance of the puffed shirring is also dependent upon the type of material employed therefor. Even with the same material, different appearances of the puffed shirring are secured if the shirring material is bias-cut, cross-cut or cut lengthwise.

Several illustrative embodiments of shirred materials produced in accordance with this invention are shown in Figures 11 to 16 inclusive.

As previously explained, the product comprises a base of any suitable material 39 which is shirred and secured by stitches 40 to the shirred material, generally indicated by the reference numeral 41. The shirred material comprises alternate puffed shirrings 42 and flat shirrings 43. It is to be noted that the stitches 40 are adjacent the bends or folds between the puffed and flat shirrings and serve to permanently retain the puffed and flat shirred areas in the product, even when the product is subjected to stress in either a longitudinal or transverse direction.

Figure 11:
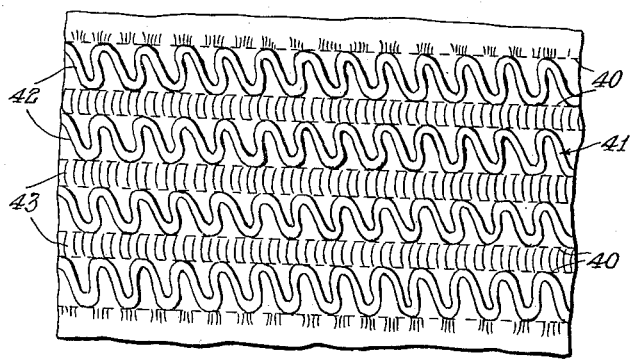
Figure 11 is a top plan view of shirred material produced by the invention when the shirring material is bias-cut.
Figure 12:
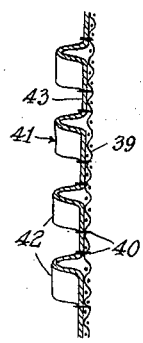
Figure 12 is an end view of the material shown in Figure 11.

When the shirring material is bias-cut, the puffed shirring will assume a configuration or form such as shown in Figure 11.

Figure 13:
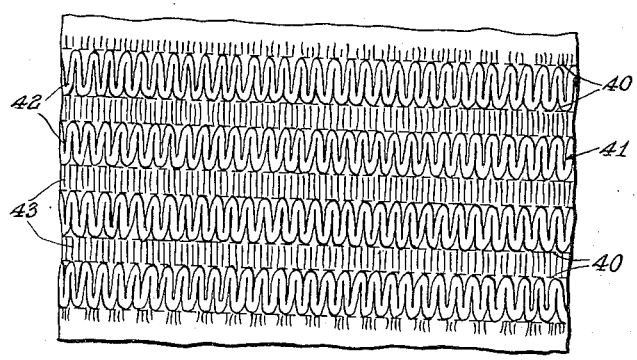
Figure 13 is a top plan view of shirred material produced by this invention when the shirring material is cross-cut.
Figure 14:
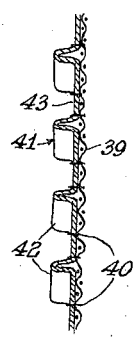
Figure 14 is an end view of the material shown in Figure 13.

When the shirring material is cross-cut, the puffed shirring assumes substantially the shape and form shown in Figure 13.

Figure 15:
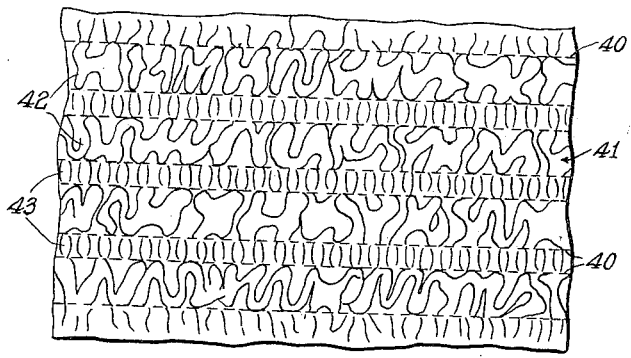
Figure 15 is a top plan view of shirred material produced by this invention when the shirring material is longitudinally cut.
Figure 16:
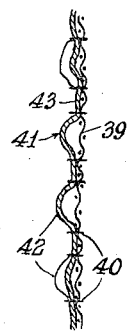
Figure 16 is an end view of the material shown in Figure 15.

When the shirring material is cut lengthwise, the puffed shirring assumes substantially the form and shape shown in Figure 15.

The articles disclosed in Figures 11–16 of the drawings form the subject-matter of application Serial No. 183,282, filed January 4, 1938 (now Patent No. 2,147,463), and the apparatus herein described forms the subject-matter of application Serial No. 183,281, filed January 4, 1938 (now Patent No. 2,147,462).

Since it is obvious that various changes and modifications may be made in the above description without departing from the nature or spirit thereof, this invention is not restricted thereto except as set forth in the appended claims.

I claim:

1. A continuous method which comprises simultaneously shirring a material having alternate ridges and furrows and a flat base material to which it is to be stitched, and stitching the resulting shirred materials at approximately each bottom bend between the ridges and furrows to permanently retain the shape and form of the shirred materials in the product.

2. A continuous method which comprises forming alternate ridges and furrows in a shirring material, simultaneously feeding said shirring material and a flat base material in position for stitching at approximately each bottom bend between the ridges and furrows at a rate to shir said materials, and stitching said shirred materials at approximately each bottom bend between the ridges and furrows to permanently retain the shape and form of the shirred materials in the product.

3. A continuous method which comprises forming alternate ridges and furrows in a shirring material, simultaneously feeding said shirring material and a flat base material in position for stitching at approximately each bottom bend between the ridges and furrows at a rate to shir said materials, and stitching said shirred materials, while retaining generally the alternate ridges and furrows, at approximately each bottom bend between the ridges and furrows to permanently retain the shape and form of the shirred materials in the product.

4. A continuous method which comprises simultaneously shirring a cross-cut material having alternate ridges and furrows and a flat base material to which it is to be stitched, and stitching the resulting shirred materials at approximately each bottom bend between the ridges and furrows to permanently retain the shape and form of the shirred materials in the product.

5. A continuous method which comprises simultaneously shirring a bias-cut material having alternate ridges and furrows and a flat base material to which it is to be stitched, and stitching the resulting shirred materials at approximately each bottom bend between the ridges and furrows to permanently retain the shape and form of the shirred materials in the product.

6. A continuous method which comprises simultaneously shirring a longitudinally cut material having alternate ridges and furrows and a flat base material to which it is to be stitched, and stitching the resulting shirred materials at approximately each bottom bend between the ridges and furrows to permanently retain the shape and form of the shirred materials in the product.

CHARLES SEAMAN.